United States Patent
Butera

(10) Patent No.: US 7,600,341 B2
(45) Date of Patent: *Oct. 13, 2009

(54) SPRING PIN LOCK FOR ANIMAL TRAP

(75) Inventor: Rich Butera, Euclid, OH (US)

(73) Assignee: Oneida Victor, Inc., Ltd., Euclid, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/169,351

(22) Filed: Jul. 8, 2008

(65) Prior Publication Data

US 2008/0263937 A1 Oct. 30, 2008

Related U.S. Application Data

(63) Continuation of application No. 11/289,796, filed on Nov. 30, 2005, now Pat. No. 7,421,821.

(60) Provisional application No. 60/708,862, filed on Aug. 17, 2005.

(51) Int. Cl.
*A01M 23/26* (2006.01)
*A01M 23/24* (2006.01)

(52) U.S. Cl. .............................. 43/88; 43/96

(58) Field of Classification Search ............... 43/88–97, 43/81
See application file for complete search history.

(56) References Cited

U.S. PATENT DOCUMENTS

| | | | | |
|---|---|---|---|---|
| 877,134 A * | 1/1908 | Sprague et al. | ................. | 43/93 |
| 1,465,528 A * | 8/1923 | Rufty | ............................. | 43/88 |
| 1,494,250 A * | 5/1924 | Jones et al. | ..................... | 43/88 |
| 1,634,270 A * | 7/1927 | Samouce | ........................ | 43/88 |
| 1,647,416 A * | 11/1927 | Samouce | ........................ | 43/88 |
| 1,893,974 A * | 1/1933 | Zook | .............................. | 43/88 |
| 1,960,122 A * | 5/1934 | Pitre et al. | ...................... | 43/88 |
| 2,112,796 A * | 3/1938 | Thibodeaux | .................... | 43/92 |
| 2,247,632 A * | 7/1941 | Graybill | ......................... | 43/88 |
| 2,252,229 A * | 8/1941 | Leonard | ........................ | 43/90 |
| 2,489,095 A * | 11/1949 | Lienhard | ........................ | 43/92 |
| 2,559,348 A * | 7/1951 | De Hart | ......................... | 43/90 |
| 2,568,344 A * | 9/1951 | Lehn | .............................. | 43/90 |
| 2,680,930 A * | 6/1954 | Koch | .............................. | 43/95 |
| 2,810,983 A * | 10/1957 | Brackett | ......................... | 43/90 |
| 2,877,596 A * | 3/1959 | Elencik | ......................... | 43/88 |
| 3,206,886 A * | 9/1965 | Swanson | ........................ | 43/90 |
| 3,535,816 A * | 10/1970 | Montgomery et al. | .......... | 43/93 |
| 4,240,223 A * | 12/1980 | Medvetz et al. | ................. | 43/58 |

(Continued)

*Primary Examiner*—Darren W Ark
(74) *Attorney, Agent, or Firm*—Tucker Ellis & West LLP

(57) ABSTRACT

A trap with a cross-like frame having a first member with upturned ends in which are pivotally mounted a pair of opening and closing arch shaped jaws. A pair of jaw actuators have central apertures, each embracing both jaws at opposite ends thereof, the actuators being pivotally carried on the respective arms of an U shaped retention pin. A Spring Pin Loc is coupled to the respective arms of U Shaped Pin and extends across the cross member between an attachment for the bait pan 70 and an upturned dog mounting end of the cross member forming an attachment for a swinging trigger dog. The arms of the retention pin also carry coil springs, so that on each arm there is one spring on each side of the corresponding actuator. The coil springs urge the respective actuators upwardly toward the sprung, or closed, position of the trap.

5 Claims, 8 Drawing Sheets

U.S. PATENT DOCUMENTS

| | | | |
|---|---|---|---|
| 4,272,907 A * | 6/1981 | Skapura | 43/92 |
| 4,439,946 A * | 4/1984 | Altier | 43/81 |
| 4,486,972 A * | 12/1984 | Helfrich et al. | 43/88 |
| 4,622,774 A * | 11/1986 | Block | 43/88 |
| 4,638,589 A * | 1/1987 | Askins | 43/88 |
| 4,972,626 A * | 11/1990 | Medvetz | 43/88 |
| 5,109,627 A * | 5/1992 | Lee | 43/88 |
| 6,910,299 B2 * | 6/2005 | Butera et al. | 43/88 |
| 7,421,821 B2 * | 9/2008 | Butera | 43/88 |

* cited by examiner

SPRING PIN LOCK FOR ANIMAL TRAP

CROSS-REFERENCE TO RELATED APPLICATIONS

This application is a continuation of U.S. application Ser. No. 11/289,796 filed on Nov. 30, 2005 now U.S. Pat. No. 7,421,821 which claims the benefit of priority of U.S. Provisional Application No. 60/708,862 filed Aug. 17, 2005.

BACKGROUND OF THE INVENTION

The subject application is directed to animal trap mechanisms, and more particularly to a modified spring pin lock which allows for increased functionality and improved manufacturing efficiency. While a preferred embodiment is in conjunction with a spring mechanism for traps, it is to be appreciated that the subject design is suitably adapted to any spring-biased locking or closing mechanism for which improved manufacturing efficiency and increased force is advantageous.

In common traps, a pair of co-acting jaws are used to securely engage a leg or other member of captured animal. Ends of the jaws are pivotally connected to a body portion for pivotable displacement between an open position (for a set trap) and a closed position (for engagement with a captured animal). A pair of levers are loaded with a biasing force from an arrangement of springs. In this way, levers biased the jaws into a closed position. To set the trap, levers are depressed, loading springs and allowing jaws to be placed in an open position along a level line. A first jaw is placed level and a dog is laid over top of the jaw. An end of the dog is placed underneath a pan. In this way, the dog and pan retain the jaws in an open position, with spring biased levers fully loaded. When an animal steps on the pan, it tilts to release a trap wherein loaded levers pivot the jaws to a closed position, securely capturing the animal.

A typical spring or biasing means includes a spring which is applied in a torisional twist to provide force for tripping the trap. In earlier systems, such spring mechanism is typically placed on a u-shaped bar (also known as a U shaped retention pin) which is disposed on a base or lower portion of a trap. However, conventional spring pin assemblies may separate from the mechanism. As such, a spring pin wire is not locked into place, and the spring pin can come out, causing the trap to fall apart. In addition, spring pin wires limit the number of springs that can be successfully employed on a trapping mechanism.

SUMMARY OF THE INVENTION

The subject system afore-noted problems, and others, and teaches a spring pin lock assembly comprising a spring pin loc and a U shaped retention pin which allows for more securely holding a spring or biasing mechanism onto a frame, as well as allows for additional springs to be used on a trap.

DETAILED DESCRIPTION OF THE INVENTION

The animal trap 10 disclosed herein is of a general type similar to that described in U.S. Pat. Nos. 4,638,589 and 6,910,299 hereby incorporated by reference. Accordingly, the construction and operation of trap 10 will not be described herein in great detail except insofar as it pertains to the particular features of the invention.

Figure 1:
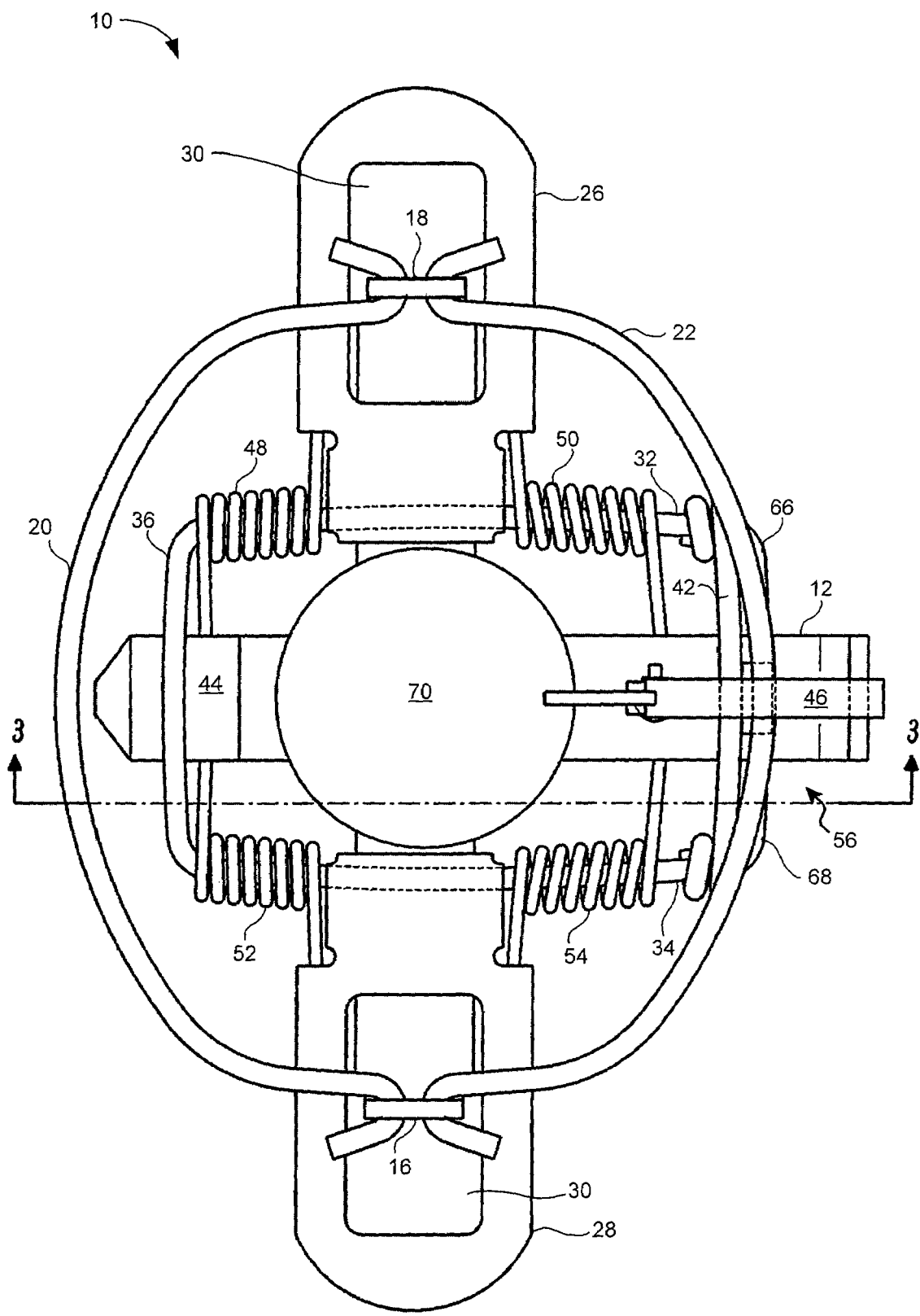
FIG. 1 is a perspective view of a trap in the open position.
Figure 2:
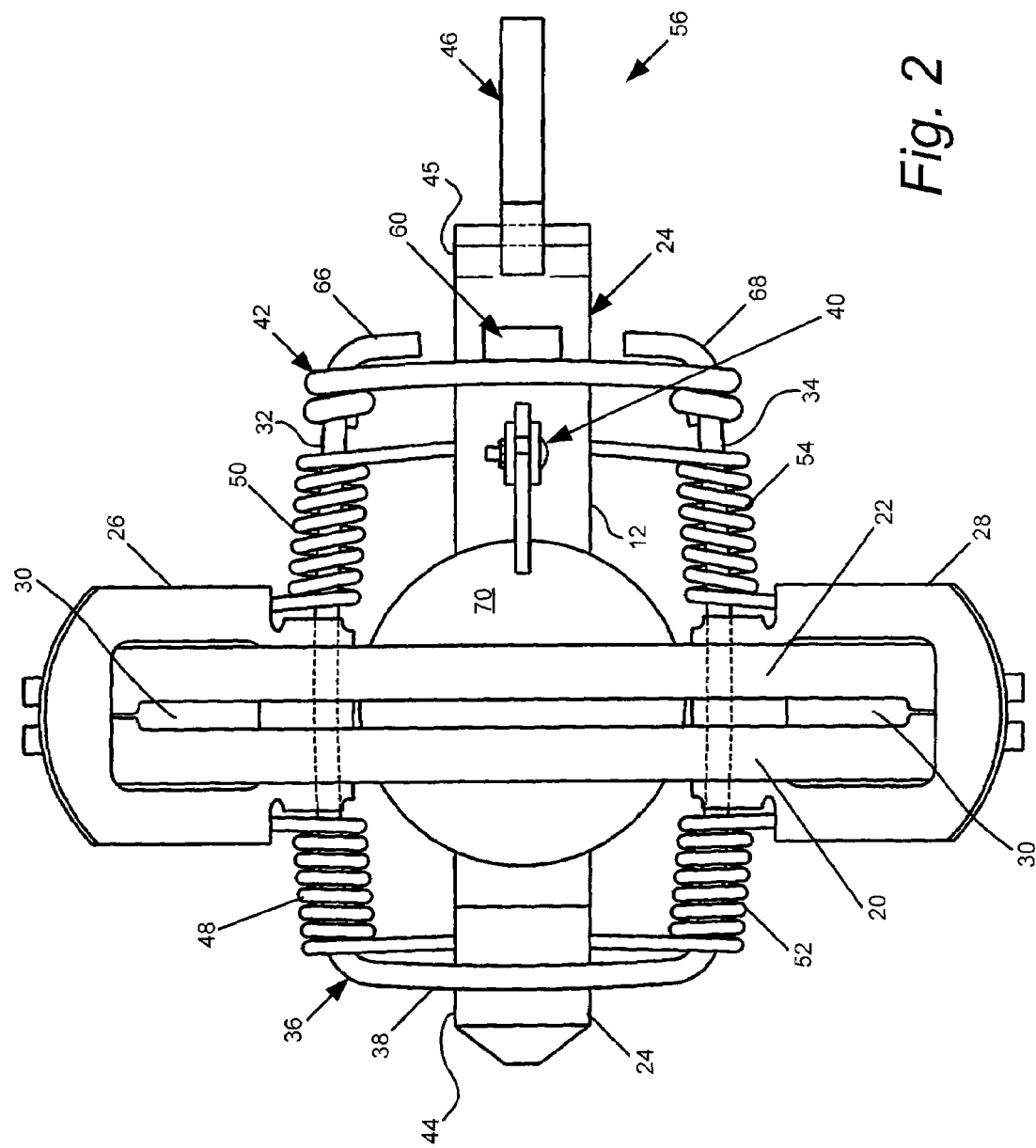
FIG. 2 is a perspective view of the trap in the closed position.

In general terms, trap 10 includes a cross-like frame 12 having a first member 14 with upturned ends 16, 18 in which are pivotally mounted a pair of opening and closing arch shaped jaws 20, 22. The frame further includes a cross member 24. A pair of jaw actuators 26, 28 have central apertures 30, each embracing both jaws 20, 22 at opposite ends thereof, the actuators 26, 28 being pivotally carried on the respective arms 32, 34 of an U shaped retention pin 36. Spring Pin Loc 42 is coupled to the respective arms 32, 34 of U Shaped Pin 36 and extends across the cross member 24 between an attachment 40 for the bait pan 70 and an upturned dog mounting end 45 of the cross member 24 forming an attachment for a swinging trigger dog 46. The arms 32, 34 of the retention pin 36 also carry coil springs 48, 50, 52, 54 so that on each arm there is one spring on each side of the corresponding actuator 26, 28. The coil springs 48, 50, 52, 54 urge the respective actuators 26, 28 upwardly toward the sprung, or closed, position of trap 10 as shown in the drawings (FIG. 2). An aspect of the present invention is that a spring pin loc 42 is coupled to the arms 32, 34 of the U shaped retention pin 36 as shown in the drawings.

As illustrated in the drawings, the U shaped retention pin 36 has the base 38 on the opposite side of the dog side 56 of trap 10. The spring pin loc 42 is coupled to the U shaped retention pin 36 to lock the U shaped retention pin 36 in place. Without spring pin loc 42, U shaped retention pin 36 has no backing to hold the retention pin 36 in place. If U shaped retention pin 36 is not locked into place, U shaped retention pin 36 can be removed from trap 10, causing trap 10 to disassemble and fall apart. An aspect of adding spring pin loc 42 is that it enables the adding of two more springs 50, 54 to trap 10 and locks springs 50, 54 into place. Furthermore, the length of the arms 32, 34 of the U shaped retention pin 36 are suitable for spring pin loc 42 to engage the depression 58 on the dog side 56 of trap 10, however, if the U shaped pin 36 is pulled away from trap 10, the spring pin loc 42 will engage the attachment 40 and prevent the U shaped retention pin 36 from being pulled past the cross member 24 and disengaging from trap 10. If the U shaped retention pin 36 is pushed towards the dog side 56 of trap 10, stop 60 prevents it from moving past the cross member 24 of the dog side 56 of trap 10.

Figure 3:
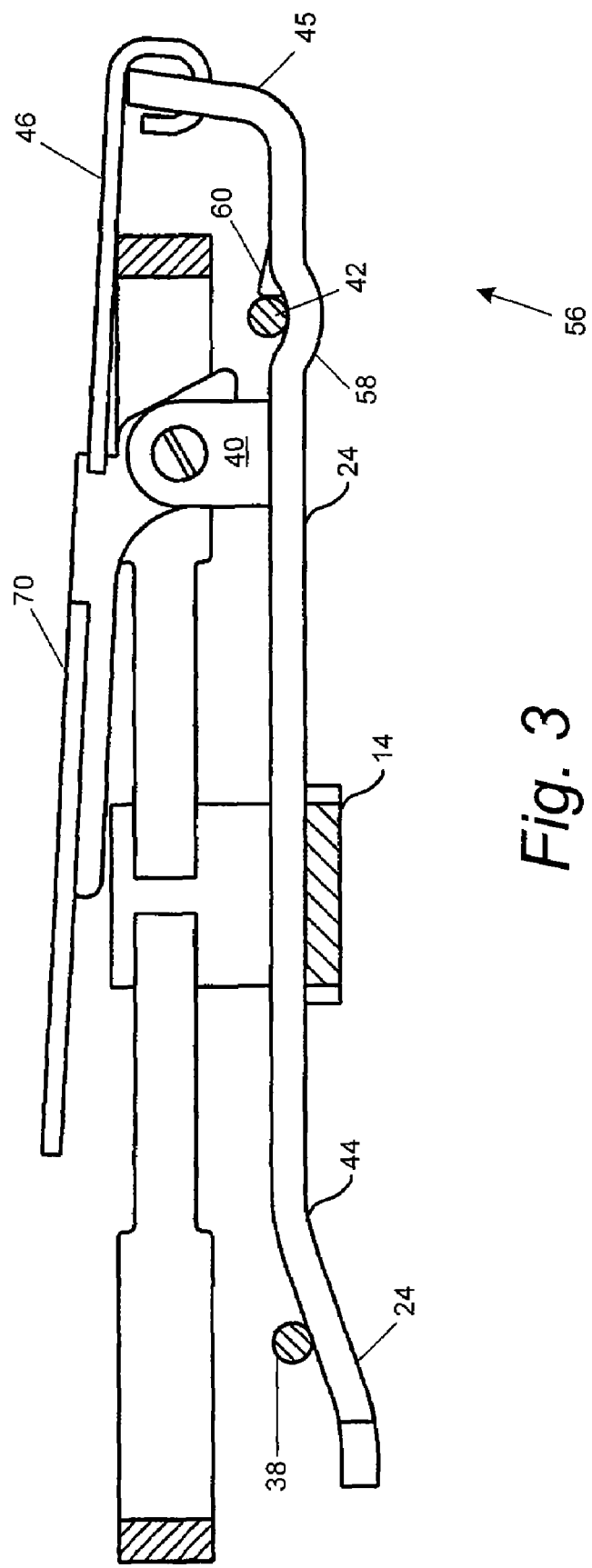
FIG. 3 is a side view of the trap.
Figure 4:
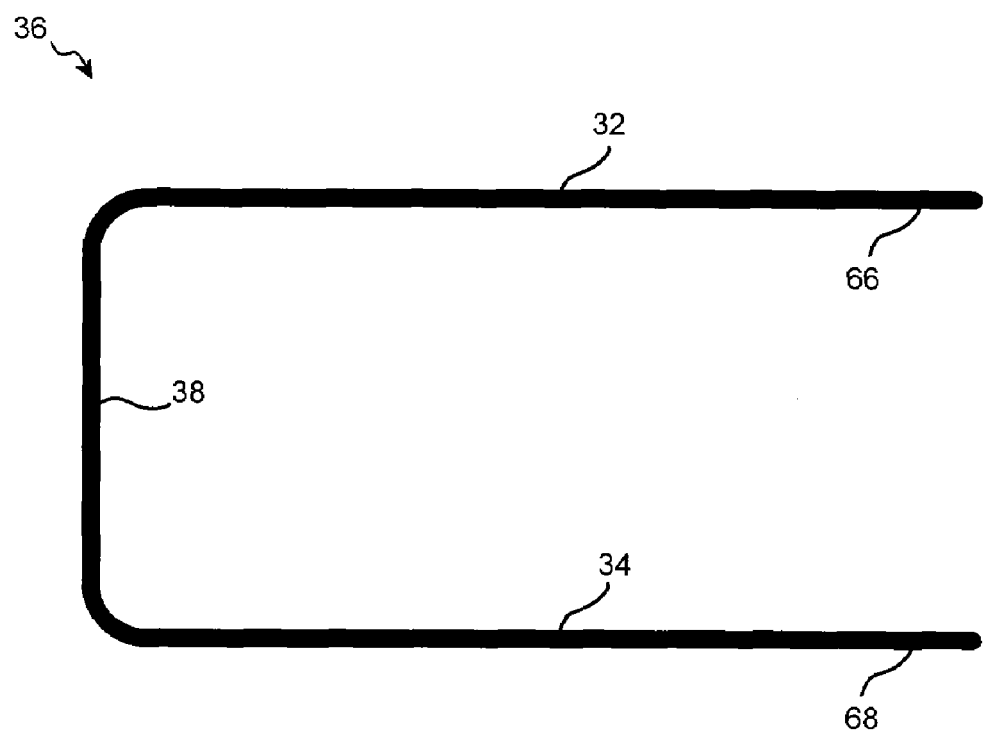
FIG. 4 is a perspective view of a U shaped retention pin.
Figure 5A:
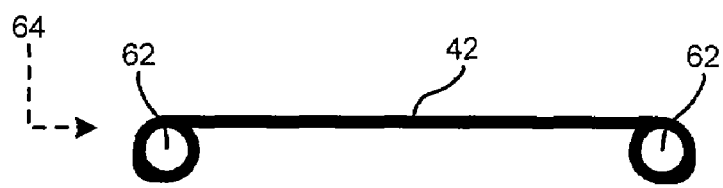
FIGS. 5a and 5b are perspective views of a Spring Pin Loc.
Figure 5B:

An aspect of the spring pin loc 42 is that the apertures 62 or surfaces engaging the arms 32, 34 of U shaped retention pin 36 are lower than the longitudinal axis 64 of spring pin loc 42. Spring pin loc 42 sits in depression 58 (see FIG. 3) on the dog side 56 of trap 10. This enables U shaped retention pin 36 to stay lower on trap 10 and not interfere with jaws 20, 22.

Figure 6:
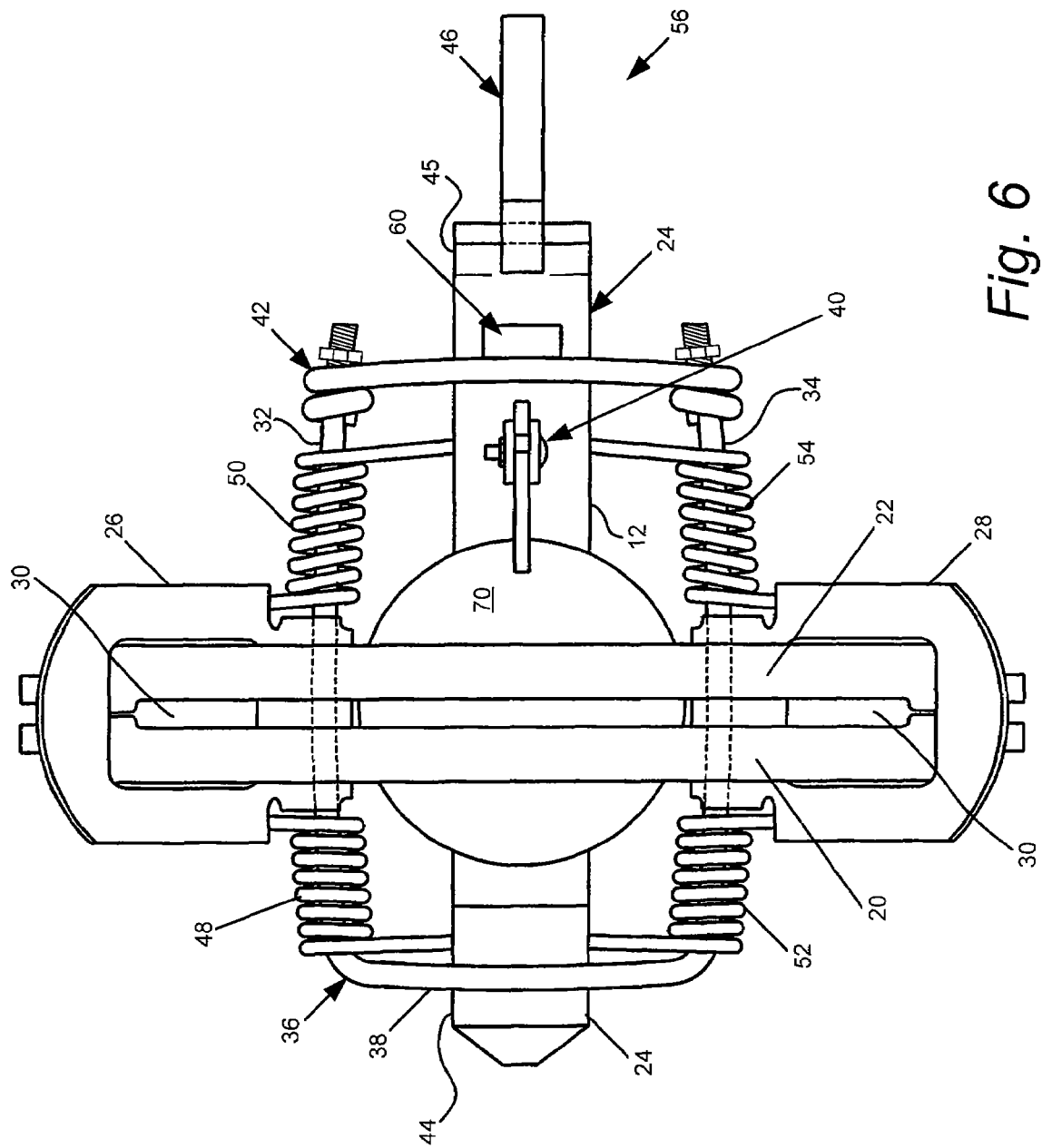
FIG. 6 is a perspective view illustrating the spring pin loc coupled to the U shaped retention pin with a threaded fastener.
Figure 7:
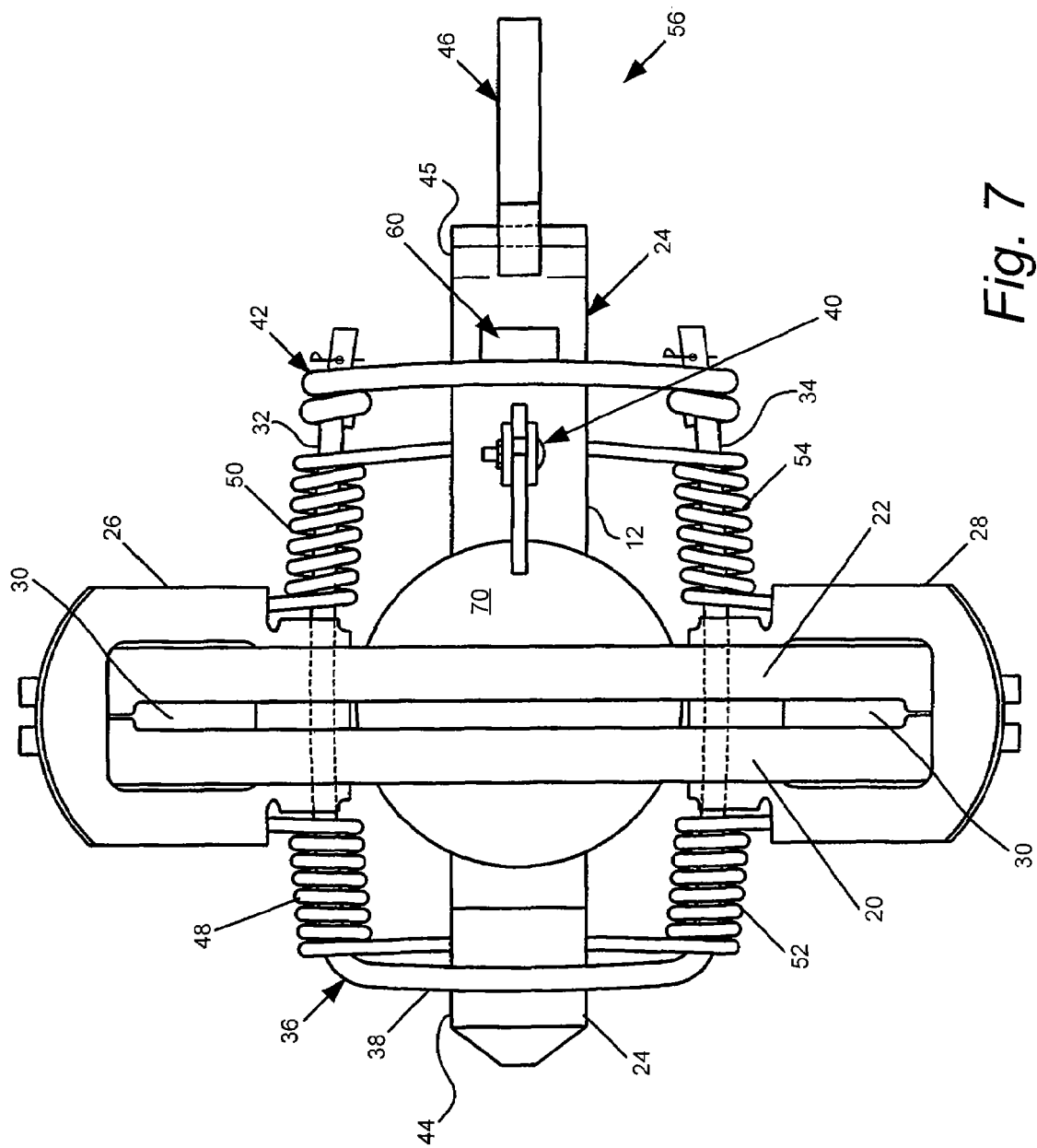
FIG. 7 is a perspective view illustrating the spring pin loc coupled to the U shaped retention pin with a cotter pin.
Figure 8:
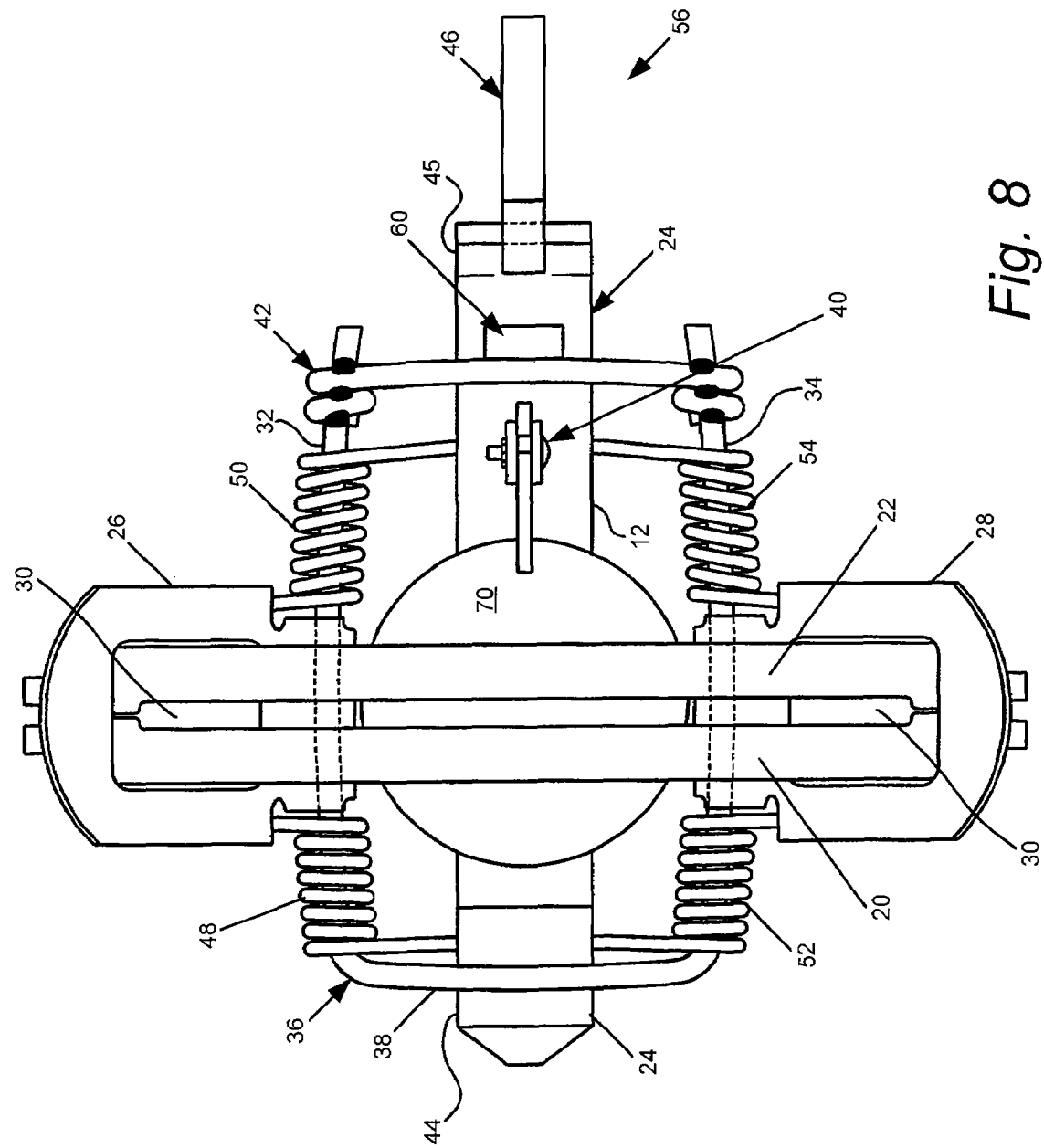
FIG. 8 is a perspective view illustrating the spring pin loc coupled to the U shaped retention pin via solder.

As illustrated, the ends 66, 68 of the arms 32, 34 of U shaped retention pin 36 are bent to hold spring pin loc 42 in place. However, those skilled in the art can readily appreciate that any well known means can be used to hold spring pin loc 42 into place on U shaped retention pin 36, including but not limited to a threaded fastener such as a nut (FIG. 6), cotter pins (FIG. 7), soldering and/or welding (FIG. 8). Furthermore, although spring pin loc 42 is illustrated using a wire that is bent to form the apertures 62, those skilled in the art can readily appreciate that any equivalent structure is suitable in accordance with an aspect of the present invention.

Figure 9:
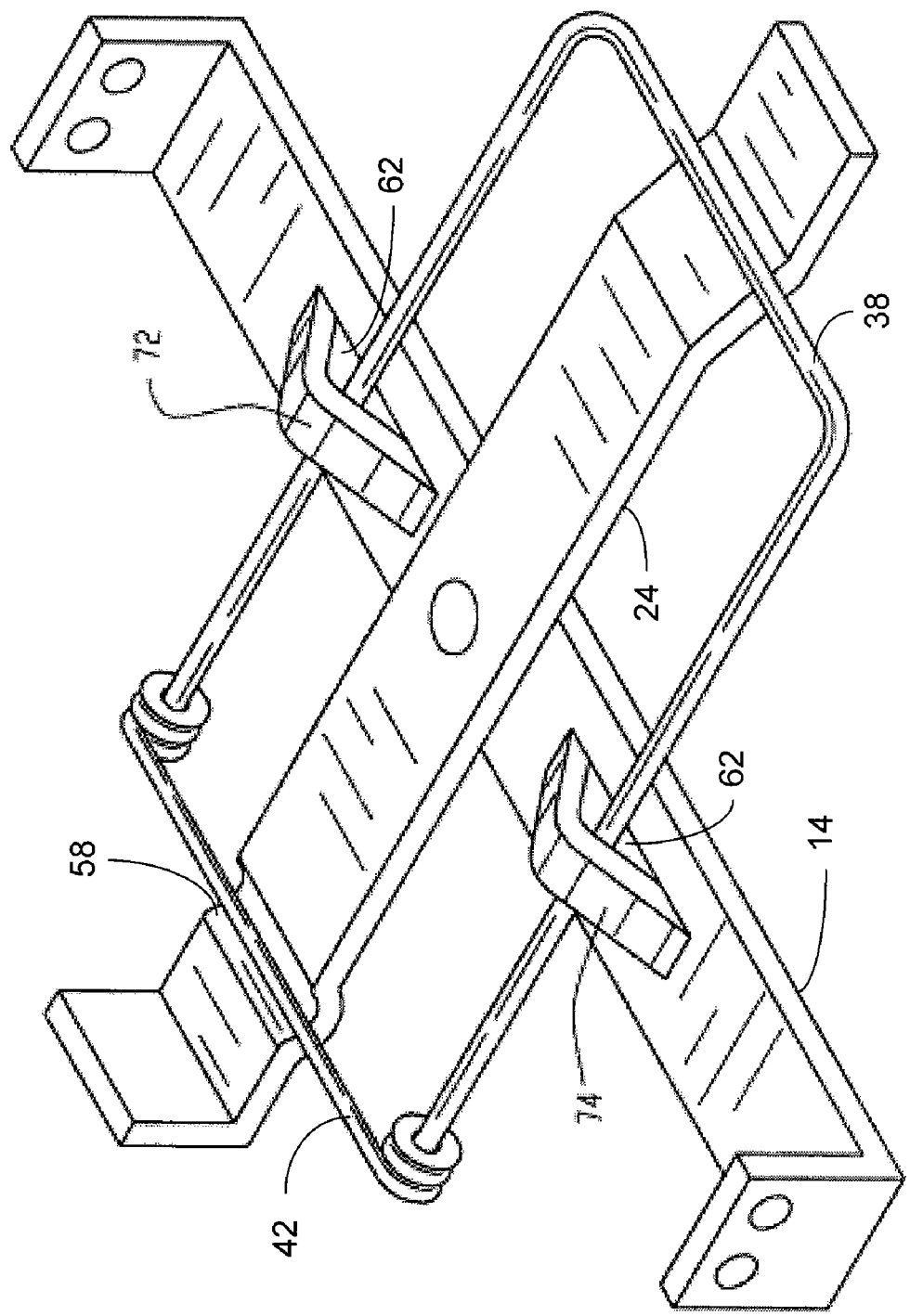
FIG. 9 is a top view of the trap without the jaws and actuators.

FIG. 9 is a top view of trap 10 without jaws 20, 22 and actuators 26, 28 which illustrates how U shaped retention pin 36 is held in place by lances 72, 74 on first member 14. The base 38 of U shaped retention pin rests on slanted portion 44 of frame 12. Spring pin loc 42 is coupled to U shaped retention pin on dog side 56 or trap 10.

The invention claimed is:

1. An animal trap, comprising:
a cross like frame having a first member with lances and upturned ends and a cross member, the cross member comprising a dog side and a side opposite the dog side, the side opposite the dog side of the cross member further comprising a slanted portion;
a pair of jaws pivotally mounted on the upturned ends and configured to open and close;
a U shaped retention pin having a base portion and a pair of arms extending from the base portion, the base portion resting on the side opposite the dog side of the cross member, the arms of the U shaped retention pin passing through the lances on the first member, wherein the base portion of the U shaped retention pin extends across the slanted portion;
a first jaw actuator pivotally mounted on a first arm of the pair of arms of the U shaped retention pin, the first jaw actuator having a central aperture embracing the pair of jaws at first ends of the jaws;
a second jaw actuator pivotally mounted on a second arm of the pair of arms of the U shaped retention pin, the second jaw actuator having a central aperture embracing the pair of jaws at second ends of the jaws;
a swinging trigger dog;
an attachment for the swinging trigger dog at one end of the cross member which is on the dog side of the cross member, wherein the swinging trigger dog is mounted on the dog side of the cross member;
a bait pan;
an attachment for the bait pan on the cross member;
a spring pin loc coupled to the arms of the U shaped pin and secured to the arms of the U shaped retention pin at the dog side of the cross member in a manner to prevent the spring pin loc from sliding off the U shaped retention pin;
a stop mounted on the dog side of the cross member between the attachment for the bait pan and the attachment for the swinging trigger dog, the stop extending above a top surface of the cross member, wherein the spring pin loc extends across the cross member between the attachment for the bait pan and the stop;
wherein the cross member further comprises a depression between the attachment for the bait pan and the stop, wherein the spring pin loc rests in the depression;
a first coil spring mounted on the first arm of the U shaped retention pin between the first actuator and the base end of the U shaped retention pin coupled to the first actuator;
a second coil spring mounted on the first arm of the U shaped retention pin between the first actuator and the spring pin loc coupled to the first actuator;
a third coil spring mounted on the second arm of the U shaped retention pin between the second actuator and the base end of the U shaped retention pin coupled to the second actuator; and
a fourth coil spring mounted on the second arm of the U shaped retention pin between the second actuator and the spring pin loc coupled to the second actuator.

2. The animal trap of claim 1 wherein the arms of the U shaped retention pin are bent to prevent removal of the spring pin loc.

3. The animal trap of claim 1 further comprising:
the arms of the U shaped retention pin further comprising threads; and
a threadable fastener engaging the threads on each of the arms of the U shaped retention pin.

4. The animal trap of claim 1, further comprising:
an aperture in each of the arms of the U shaped retention pin; and
a pin suitably adapted to fit in each of the apertures in each of the arms of the U shaped retention pin to prevent the spring pin loc from disengaging the U shaped retention pin.

5. The animal trap of claim 1, wherein the arms of the U shaped retention pin are bent sufficiently to prevent the spring loc pin from disengaging the U shaped retention pin.

\* \* \* \* \*